(12) United States Patent
Cohin et al.

(10) Patent No.: US 9,732,885 B2
(45) Date of Patent: Aug. 15, 2017

(54) COOLING DEVICE FOR THE CASING OF AN AIRCRAFT JET ENGINE COMPRISING A SUPPORTING DEVICE

(71) Applicant: SNECMA, Paris (FR)

(72) Inventors: Arthur Cohin, Moissy Cramayel (FR); Baghdad Achbari, Moissy Cramayel (FR); Audrey Charrie, Moissy Cramayel (FR); Aurélien René-Pierre Massot, Moissy Cramayel (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/770,209

(22) PCT Filed: Feb. 25, 2014

(86) PCT No.: PCT/FR2014/050388
§ 371 (c)(1),
(2) Date: Aug. 25, 2015

(87) PCT Pub. No.: WO2014/131978
PCT Pub. Date: Sep. 4, 2014

(65) Prior Publication Data
US 2016/0003088 A1    Jan. 7, 2016

(30) Foreign Application Priority Data
Feb. 26, 2013    (FR) ...................... 13 51676

(51) Int. Cl.
*F16L 3/227*    (2006.01)
*F16L 3/223*    (2006.01)
(Continued)

(52) U.S. Cl.
CPC .............. *F16L 3/227* (2013.01); *F01D 11/24* (2013.01); *F01D 25/28* (2013.01); *F02C 7/18* (2013.01);
(Continued)

(58) Field of Classification Search
CPC ...... F02C 7/12; F02C 7/18; F02C 7/32; F01D 11/20; F01D 11/24; F01D 25/14;
(Continued)

(56) References Cited

U.S. PATENT DOCUMENTS 4,069,662 A * 1/1978 Redinger, Jr. .......... F01D 11/24
                                                      415/116
4,859,142 A    8/1989 Burke et al.
(Continued)

FOREIGN PATENT DOCUMENTS

| DE | 10 2011 103 158 A1 | 12/2012 |
| FR | 2 626 622 A | 8/1989 |
| WO | WO 2010/122120 A1 | 10/2010 |

OTHER PUBLICATIONS

International Search Report as issued in International Patent Application No. PCT/FR2014/050388, dated May 26, 2014.
(Continued)

*Primary Examiner* — Gerald L Sung
*Assistant Examiner* — Jason H Duger
(74) *Attorney, Agent, or Firm* — Pillsbury Winthrop Shaw Pittman LLP

(57) ABSTRACT

A cooling device for the casing of a jet engine, includes a cooling tube and a supporting device, the supporting device including an attachment plate and an attachment clamp, the attachment clamp including a clamp body surrounding the cooling tube and an attachment element attached to the attachment plate, wherein the attachment plate includes: an opening; and an attachment tab secured to the main wall of the attachment plate and arranged on at one portion of the periphery of the opening, the attachment clamp passing through the opening, and the attachment element of the attachment clamp being attached to the attachment tab.

16 Claims, 3 Drawing Sheets

(51) Int. Cl.

| | |
|---|---|
| *F01D 25/28* | (2006.01) |
| *F01D 11/24* | (2006.01) |
| *F16L 3/22* | (2006.01) |
| *F16L 53/00* | (2006.01) |
| *F02C 7/18* | (2006.01) |

(52) U.S. Cl.
CPC ............... *F16L 3/221* (2013.01); *F16L 3/223* (2013.01); *F16L 53/00* (2013.01); *F05D 2260/30* (2013.01)

(58) Field of Classification Search
CPC .. F01D 25/28; F05D 2240/14; F05D 2240/91; F05D 2260/30; F16L 3/00; F16L 3/1211; F16L 3/1218; F16L 3/22; F16L 3/221; F16L 3/223; F16L 3/227; F16L 53/00; F16L 59/135; H02G 7/05; F24F 13/0254
See application file for complete search history.

(56) References Cited

U.S. PATENT DOCUMENTS

| | | | | |
|---|---|---|---|---|
| 5,816,554 | A * | 10/1998 | McCracken | E04F 15/02458 248/346.01 |
| 6,185,925 | B1 | 2/2001 | Proctor et al. | |
| 6,502,791 | B2 * | 1/2003 | Parker | F16L 3/18 248/405 |
| 6,536,717 | B2 * | 3/2003 | Parker | F16L 3/11 248/346.01 |
| 7,857,264 | B2 * | 12/2010 | Carter | F16L 3/04 248/65 |

OTHER PUBLICATIONS

International Preliminary Report on Patentability and the Written Opinion of the International Searching Authority as issued in International Patent Application No. PCT/FR2014/050388, dated Sep. 1, 2015.

* cited by examiner

COOLING DEVICE FOR THE CASING OF AN AIRCRAFT JET ENGINE COMPRISING A SUPPORTING DEVICE

CROSS-REFERENCE TO RELATED APPLICATIONS

This is the U.S. National Stage of PCT/FR2014/050388, filed Feb. 25, 2014, which in turn claims priority to French Patent Application No. 1351676, filed Feb. 26, 2013, the entire contents of all applications are incorporated herein by reference in their entireties.

TECHNICAL FIELD OF THE INVENTION

This invention relates to a cooling device for the casing of a jet engine, said cooling device comprising a supporting device.

The technical field of the invention is, generally, that of aircraft engines, and more particularly that of cooling various elements, in particular casings of low pressure turbines, of the engines considered.

In order to provide for the cooling of certain casings of low pressure turbines, a cooling device is provided that calls upon a set of cooling tubes arranged outside of the casing, most often by surrounding said casing, in such a way that air is sent to the external face of the casing considered. The cooling tubes are typically supplied by two units arranged on either side of the casing considered, in such a way that each case is supplied with air cooling tubes surrounding the casing considered over about one-fourth of its lateral circumference. This is referred to as a system of the LPTCC (Low Pressure Turbine Clearance Control) type. The LPTCC system can be controlled by the FADEC (Full Authority Digital Engine Control); this is then referred to as active control, with the system then being designated by the acronym LPTACC. When it is not controlled by the FADEC, this is referred to as passive control for the LPTCC system. Its main function is to regulate the clearance of the low pressure turbine by modulating the flow of air taken from the secondary flow for the cooling of the low pressure turbine casing.

PRIOR ART OF THE INVENTION

Cooling tubes, and in particular those of LPTCC systems, are made secure by the intermediary of the supply units with the external face of the casing that they must cool. It is furthermore necessary to provide a good positioning of the cooling tubes that act on the casing, in particular in the locations that are the farthest away from the supply units; for this purpose, prior art provided for the use of an attachment plate that consists of a flat plate under which is attached clamps, said clamps surrounding the cooling tubes, making it possible to maintain said tubes in position. Such a solution is satisfactory for large-size casings, for which the cooling tubes are sufficiently separated from one another. The solution of prior art is however not compatible with casings present on small-size engines, as for example the Silvercrest (registered trademark) engine; indeed, the axial separation between two consecutive cooling tubes does not make it possible to easily position the various clamps on the surface plane of the attachment plate.

GENERAL DESCRIPTION OF THE INVENTION

The invention offers a solution to the disadvantages mentioned hereinabove, by proposing the use of a cooling device that has a particular supporting device for the attachment clamps.

For this purpose, on propose in the invention the use of a particular attachment plate in order to provide the support of the attachment clamps. The attachment plate used in the invention is a plate that has one or several openings and one of several attachment tabs. This particular shape makes it possible in particular to provide for the attaching of the clamps surrounding the cooling tubes on the attachment plate vertically, contrary to the horizontal attaching used in prior art. It as such makes it possible to optimize the space that allows for the attaching of the clamps with a desired positioning without being hindered by the presence of cooling tubes nearby. An advantage of the solution proposed in the invention also resides in the fact that it is inexpensive and industrially simple to set in place. Advantageously, embodiments make it possible to improve the mechanical resistance of the device according to the invention.

The invention therefore primarily relates to a cooling device for the casing of a jet engine comprising at least one first cooling tube and a supporting device, the supporting device comprising an attachment plate and at least one first attachment clamp, the attachment plate comprising a main wall that has an internal face and an external face, the first attachment clamp comprising a clamp body surrounding the first cooling tube and an attachment element attached to the attachment plate, the clamp body of the first attachment clamp being positioned on the side of the internal face of the main wall of the attachment plate, the attachment plate comprising:
At least one first opening;
At least one first attachment tab secured to said main wall of the attachment plate and arranged on at least one portion of the periphery of the first opening, the first attachment tab projecting from the external face of the main wall, the first attachment clamp passing through the first opening, the attachment element of said first attachment clamp being attached to the first attachment tab.

In this document, "an element A secured to an element B" means an element A in contact with an element B, with the element A and the element B having no relative movement with respect to one another.

In addition to the characteristics mentioned in the preceding paragraph, the cooling device according to the invention can have one or several complementary characteristics among the following, taken individually or according to any technically permissible combination:

The first attachment tab is substantially perpendicular to said main wall of the attachment plate. As such, the supporting of the attachment element of the first attachment clamp at the first attachment tab is facilitated. "Substantially perpendicular" means the fact that the angle between the first attachment tab and the main wall of the attachment plate at where the latter joins the first attachment tab is between 75° and 105°.

The first attachment tab and the attachment plate form a single piece. As such, the solidity of the junction between the first attachment tab and the attachment plate is improved.

The first attachment tab is a cut-out of the main wall of the attachment plate, said cut-out being made according to the shape of the first attachment tab of which one side is not cut out, with this side remaining secured to the main wall of the attachment plate, said cut-out being folded back according to said side in order to form the first attachment tab projecting from the external face of the main wall of the attachment plate.

The main wall of the attachment plate has a first lateral edge and a second lateral edge, at least one of said first lateral edge and second lateral edge being curved. The existence of at least one lateral curved edge provides better rigidity of the attachment plate considered.

The supporting device comprises a means for rigidifying the first attachment tab. As such, the control of the angular positioning of the first attachment tab is improved, a contribution is made in reducing the vibrations and therefore in minimising the risk of generating a crack in the junction zones, and finally a contribution is made in increasing the service life of the supporting device.

The main wall of the attachment plate has a first lateral edge and a second lateral edge and the means of rigidifying of the first attachment tab is formed by an extension of at least one of said first lateral edge and second lateral edge made secure to the first attachment tab. As such, the solidity of the supporting device is improved. In this document, "an element A made secure with an element B" means an element A connected to an element B in such a way that the element A and the element B have no relative movement with respect to one another.

The main wall of the attachment plate has a first lateral edge and a second lateral edge and the means of rigidifying of the first attachment tab is a cut-out from an extension of at least one of said first lateral edge and second lateral edge according to the shape of said means of rigidifying of which one side is not cut out, with this side remaining secured to at least one of said first lateral edge and second lateral edge of the main wall of the attachment plate.

Said cut-out is folded at least according to said side in such a way that said cut-out is in contact with said first attachment tab.

Said cut-out is made secure to said first attachment tab.

Said cut-out is made secure to said first attachment tab by brazing or by welding.

Device according to one of the preceding claims characterised in that the main wall of the attachment plate comprises several portions, with two consecutive portions forming an angle between them.

As such, the attachment plate can be adapted to the shape of the cooling device for the casing of a jet engine.

"Consecutive portions of the main wall of the attachment plate" means two portions extending along the width of the attachment plate and adjoining one another.

The attachment element of the first attachment clamp is attached to the first attachment tab by at least one means of attaching that pass through the first attachment tab.

The means of attaching passing through the first attachment tab and attaching the attachment element of the first clamp to the first attachment tab is an attachment screw.

Device further comprising at least one second cooling tube consecutive to the first cooling tube, with the supporting device further comprising at least one second attachment clamp, the second attachment clamp comprising a clamp body surrounding the second cooling tube and an attachment element attached to the attachment plate, the clamp body of the second attachment clamp being positioned on the side of the internal face of the main wall of the attachment plate, the main wall of the attachment plate further comprising at least one second opening, the attachment plate further comprising at least one second attachment tab secured to said main wall of the attachment plate and arranged at one portion of the periphery of the second opening, the second attachment tab projecting from the external face of the main wall, the second attachment clamp passing through the second opening, the attachment element of said second attachment clamp being fixed on the second attachment tab.

"A second cooling tube consecutive to the first cooling tube" means a second tube extending circumferentially immediately next to the first tube, no intermediate tube being arranged between the first and the second tube.

The second attachment tab advantageously has the same characteristics as the attachment tab. Alternatively, the second attachment tab may not have the same characteristics as the first attachment tab.

The main wall of the attachment plate comprises a left portion and a right portion extending according to the length of the main wall, the first attachment tab and the second attachment tab being consecutive and occupant respectively said right portion and said left portion of the main wall of the attachment plate. As such, for two consecutive attachment tabs, the access to each attachment tab for the setting up of the supporting for the attachment element of each attachment clamp at each attachment tab is facilitated.

"The first attachment tab and the second attachment tab being consecutive>> means the fact that, the first tab belonging to a first plane and the second tab belonging to a second plane, said first plane and second plane being substantially parallel, there is no intermediate plane that contains an intermediate tab, with said intermediate plane being substantially parallel to said first and second planes and arranged between said first plane and second plane.

This invention also relates to an aircraft comprising a jet engine with at least one casing, said casing comprising a cooling device according to the invention.

The invention and its various applications shall be understood better when reading the following description and when examining the accompanying figures.

BRIEF DESCRIPTION OF THE FIGURES

The figures are presented solely for the purposes of information and in no way restrict the invention. The figures show.

DETAILED DESCRIPTION OF AT LEAST ONE EMBODIMENT OF THE INVENTION

Unless mentioned otherwise, the same element appearing on different figures has a unique reference.

Figure 1:
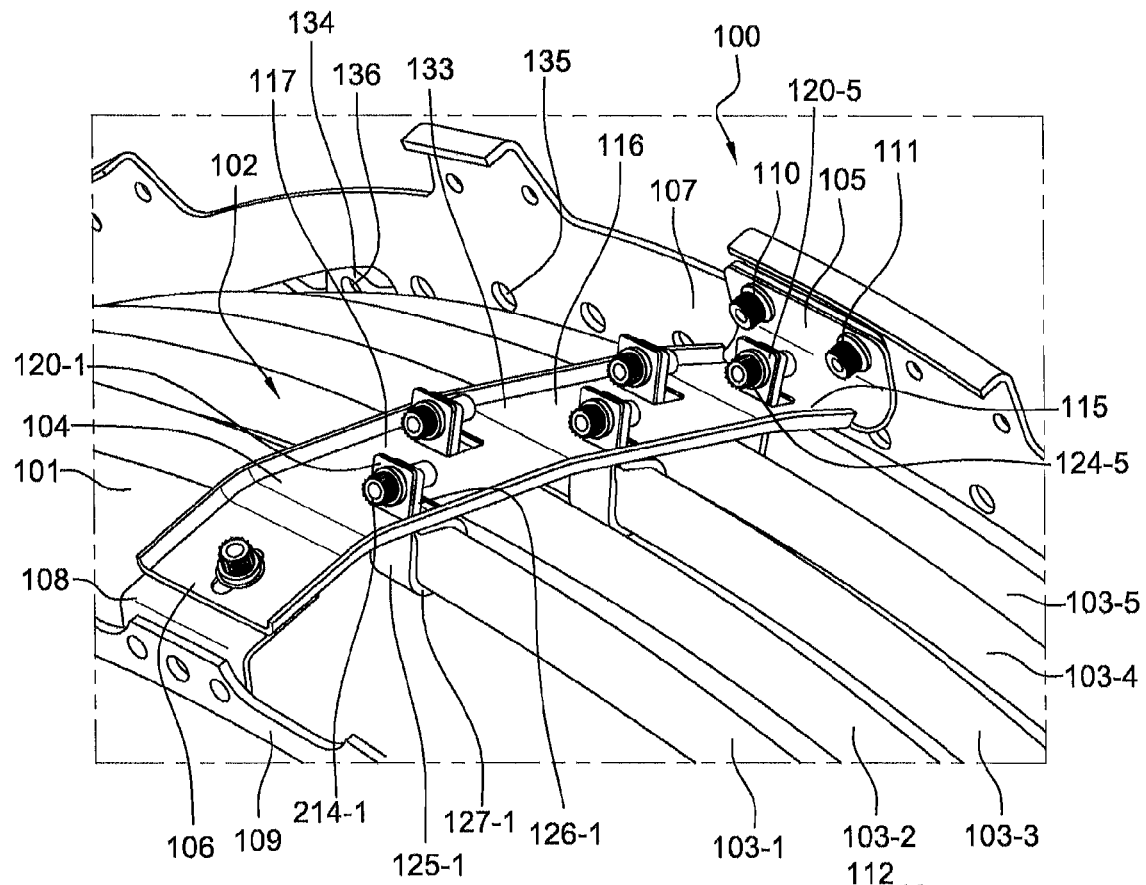
FIG. 1 diagrammatically shows a cooling device according to the invention according to a first embodiment with a supporting device comprising a particular attachment plate.
Figure 2:
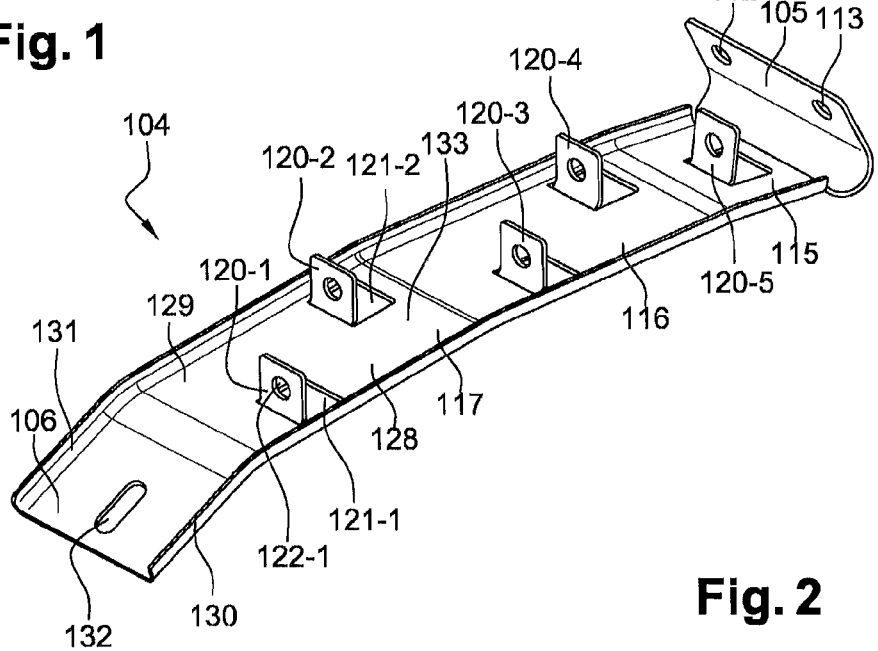
In FIG. 2, a first view of the attachment plate used in the supporting device of FIG. 1.
Figure 3:
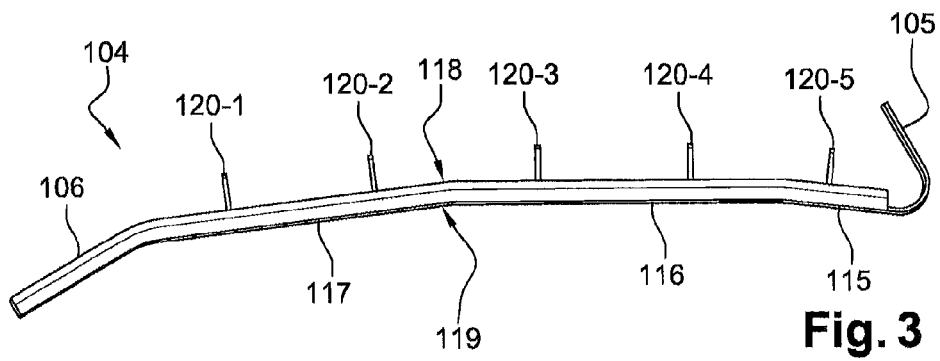
In FIG. 3, a second view of the attachment plate used in the supporting device of FIG. 1.
Figure 4:
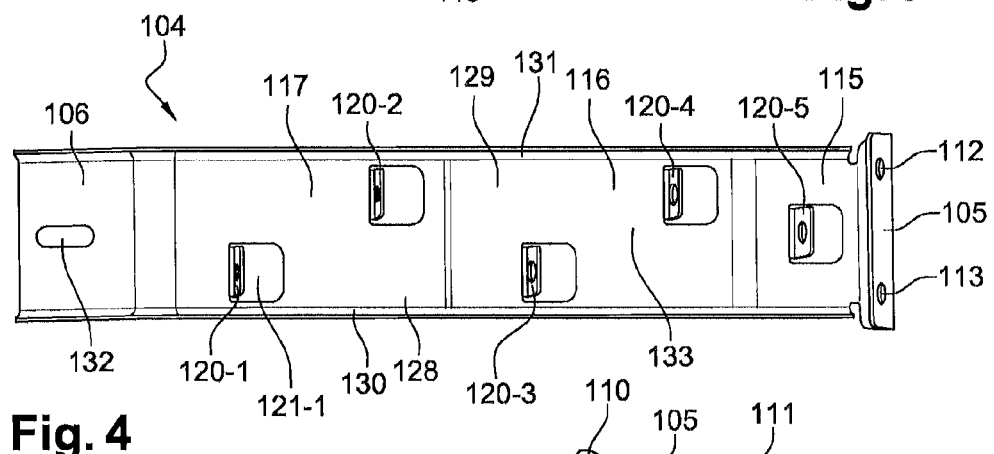
In FIG. 4, a third view of the attachment plate used in the supporting device of FIG. 1.

FIG. 1 diagrammatically shows a partial view of a cooling device 100 of a casing 101 of a Low Pressure Turbine, according to a first embodiment. The cooling device 100 comprises a supporting device 102. The supporting device 102 comprises a particular attachment plate 104. FIG. 1 is described jointly with FIGS. 2, 3 and 4 which respectively show a first, a second and a third view of the attachment plate 104.

In the example shown, a plate 107 is attached to a flange 134 by the intermediary of rivets (not shown). The flange 134 has holes 136 and the plate 107 has holes 135. A bolting system passes through the holes 135 and the holes 136. The bolting system renders secure the plate 107, the casing 101 of the Low Pressure Turbine and a casing of the High Pressure Turbine (not shown).

At least one first cooling tube 103-1 is arranged around the casing 101. The supporting device 102 makes it possible to maintain the first cooling tube 103-1 in position around the casing 101. The cooling device 100 in the example shown is a LPTCC (Low Pressure Turbine Clearance Control) cooling device. With typically two supply units not shown in the figures, the first cooling tube 103-1 and the supporting device 102 constitute the cooling device 100 of the casing 101. The first cooling tube 103-1 has small openings that cannot be seen in the figures. During operation, the supply units supply with relatively cool air with respect to the casing 101 the first cooling tube 103-1, which sends to the external face of the casing 101 the air as such available through small openings that cannot be seen in the figures. Typically, the two supply units are arranged diametrically opposite on the casing 101. As such, each zone of the first cooling tube 103-1 is supplied with air by a supply unit arranged at less than one-quarter turn of the casing 101, which makes it possible to have an air flow sent via the small openings of the first cooling tube 103-1 that is sufficient regardless of the zone considered of said first cooling tube 103-1.

The first cooling tube 103-1 is maintained in position by means of the supporting device 102. The supporting device 102 comprises in particular an attachment plate 104. The attachment plate 104 has a main wall 133, a first end 105 and a second end 106. A first drill hole 112 and a second drill hole 113 are made along the length of the first end 105, as such leaving the central portion of the first end 105 free. The attachment plate 104 is attached by its first end 105 at the plate 107 of the casing 101, by the intermediary of a first means of attaching 110 and of a second means of attaching 111 that pass respectively through the first drill hole 112 and the second drill hole 113.

A third drill hole 132 is arranged in the second end 106 of the attachment plate 104. The attachment plate 104 is attached by its second end 106 to a bracket 108, by means of a third means of attaching 114, typically of the screw-nut type, passing through the third drill hole 132. Said bracket 108 is itself attached to a flange 109 of the casing 101. Two attaching planes of the first end 105 and second end 106 are as such defined respectively by the first end 105 and by a face of the bracket 108, the two attaching planes being substantially perpendicular in order to improve, for the various means of attaching 110, 111 and 114, the resistance to the vibrations that the attachment plate 104 can be subjected to.

The main wall 133 of the attachment plate 104 has an external face 118, an internal face 119, at least one opening 121-1 and at least one attachment tab 120-1. The main wall 133 can comprise one or several portions. Each portion is globally flat and extends over the entire width of the main wall 133. Two portions form an angle between them, according to the shape of the casing 101. The main wall 133 as such follows the general shape of the casing 101 thanks to its various portions and to the angles that they form between them and/or with each of the two ends. Advantageously, the attachment tab 120-1 and the attachment plate 104 form a single piece. Alternatively, the attachment tab 120-1 and the attachment plate 104 can be two parts rendered secure by welding or brazing.

In the case where the attachment tab 120-1 and the attachment plate 104 form a single piece, the attachment tab 120-1 is advantageously a cut-out of the main wall 133 of the attachment plate 104 according to the shape of the attachment tab 120-1 of which one side is not cut out. The attachment tab 120-1 is then folded back according to said side, advantageously perpendicular to said main wall 133 of the attachment plate. The folding back of the cut-out results in the forming of the opening 121-1, the attachment tab 120-1 projecting from the external face 118 of the portion of the attachment plate 104.

The attachment tab 120-1 further has a drill hole 122-1 intended to receive a fourth means of attaching 124-1, typically of the screw-nut type. An attachment clamp 125-1 comprising an attachment element 126-1 is attached to the attachment tab 120-1 by the fourth means of attaching 124-1. The attachment element 126-1 forms a flat surface wherein is arranged an opening placed at the drill hole 122-1 of the attachment tab 120-1. The attachment clamp 125-1 further comprises a clamp body 127-1 surrounding the first cooling tube 103-1. The stability of the first cooling tube 103-1 is as such provided by attaching it, by the intermediary of the attachment element 12661 of the attachment clamp 125-1, to the attachment tab 120-1.

In the example shown in FIG. 1, the cooling device 100 has, in addition to the first cooling tube 103-1, a second cooling tube 103-2, a third cooling tube 103-3, a fourth cooling tube 103-4 and a fifth cooling tube 103-5. Advantageously, each cooling tube 103-2 to 103-5 is provided as the first cooling tube 103-1. As such, each cooling tube 103-1 to 103-5 is maintained in position around the casing 101 by being attached to the attachment plate 102. Any two cooling tubes taken from among the cooling tubes 103-1 to 103-5 cannot therefore have any relative movement with respect to one another. Each cooling tube 103-1 to 103-5 retains an adequate position in order to provide for the cooling of the casing 101.

In the example shown in FIG. 1, the main wall 133 of the attachment plate 104 has a first portion 115, a second portion 116 and a third portion 117. The main wall 133 furthermore has five attachment tabs: the first attachment tab 120-1 which has just been described, a second attachment tab 120-2, a third attachment tab 120-3, a fourth attachment tab 120-4 and a fifth attachment tab 120-5. The second, third, fourth and fifth attachment tabs 120-2, 120-3, 120-4 and 120-5 are identical to the first attachment tab 120-1 which has just been described. The second, third, fourth and fifth attachment tabs 120-2, 120-3, 120-4 and 120-5 are respectively associated to the second, third, fourth and fifth cooling tubes 103-2, 103-3, 103-4, 103-5. Each of the portions 115, 116 and 117 is globally flat and extend over the entire width of the main wall of the attachment plate. The first portion 115 forms an angle with the first end 105 on the one hand and with the second portion 116 on the other hand. The second portion 116 forms an angle with the first portion 115 on the one hand and with the third portion 117 on the other hand. The third portion 117 forms an angle with the second portion 116 on the one hand and with the second end 106 on the other hand.

The fifth attachment tab 120-5 is provided with a fourth means of attaching 124-5. The fifth attachment tab 120-5 is located substantially at the centre of the first portion 115, as such leaving the lateral portions of the first portion 115 free. The first means of attaching 110 and the second means of attaching 111 of the first end 105 are positioned on the lateral portions of the first end 105 and leave the central portion of the first end 105 free. Access to the various means of attaching 110, 111 and 124-5 is as such guaranteed in order to allow for their mounting and their dismounting.

The third attachment tab 120-3 and the fourth attachment tab 120-4 belong to the second portion 116 of the main wall 133 of the attachment plate 104 and respectively occupy a right portion 128 and a left portion 129 of the main wall 133. Said right portion 128 and left portion 129 extend across the entire length of the main wall 133.

The first attachment tab 120-1 and the second attachment tab 120-2 belong to the third portion 117 of the attachment plate 104 and respectively occupy the right portion 128 and the left portion 129 of the main wall 133.

According to the first embodiment which has just been described, the attachment tabs 120-1, 120-2, 120-3, 120-4 and 120-5 are advantageously arranged alternatively on the right portion 128 and on the left portion 129 of the main wall 133. According to a second alternative embodiment, the attachment tabs can be arranged alternatively at the middle of the main wall 133 and on one of said right portion 128 and left portion 129 of the main wall 133. Generally, according to the first embodiment as according to the second embodiment, two consecutive attachment tabs, successive from the main wall 133 are not aligned according to the same longitudinal section of the main wall 133.

The attachment plate 104 has a right edge 130 and a left edge 131 extending over the length of the attachment plate 104. In order to improve the rigidity and therefore the strength of the attachment plate 104, it is provided that at least one of said right edge 130 and left edge 131 be curved in order to extend in a plane that is globally orthogonal to the surfaces defined by the various portions 115, 116 and 117 of the attachment plate 104.

Figure 5:
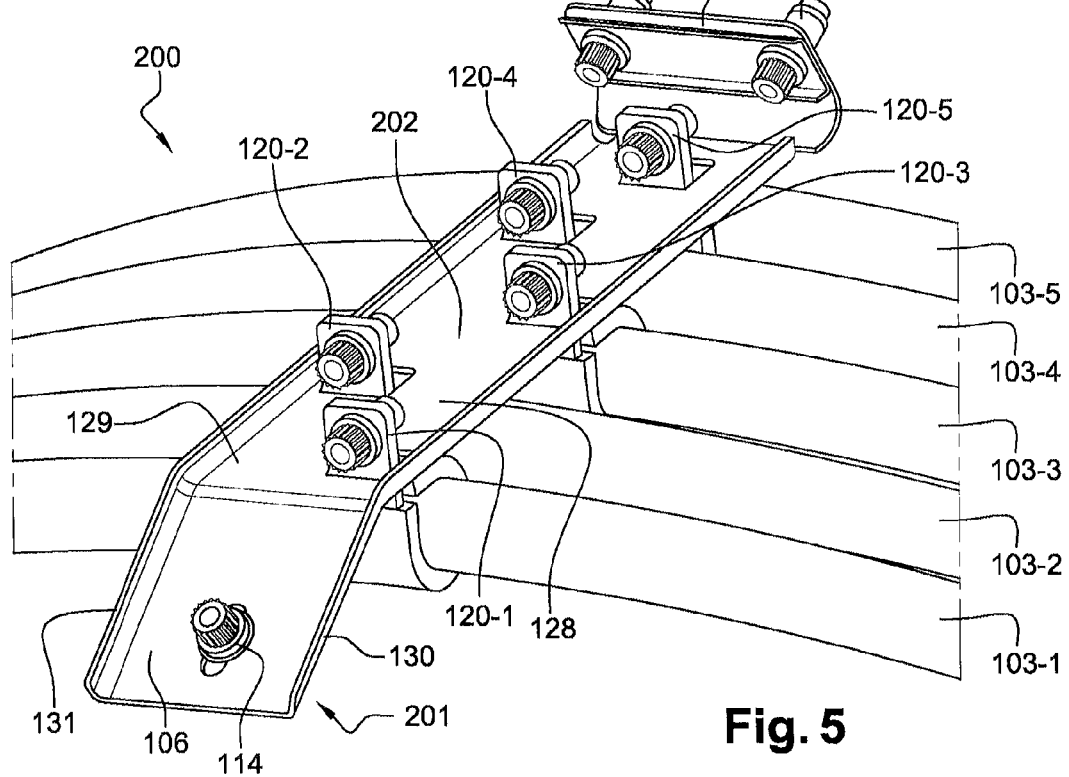
FIG. 5 diagrammatically shows a cooling device according to the invention according to a second embodiment.

FIG. 5 diagrammatically shows a cooling device 200 according to the invention, according to a second embodiment. The casing 101 is not shown in FIG. 5. The difference between the cooling device 100 that can be seen in FIG. 1 and the cooling device 200 that can be seen in FIG. 5 resides in the shape of the attachment plate 201. The attachment plate 201 comprises, in addition to its first end 105 and its second end 106, a main wall 202, globally flat, contrary to the main wall 133 of the attachment plate 104 that can be seen in FIG. 1, not flat, which comprises three portions 115, 116 and 117.

Figure 6:
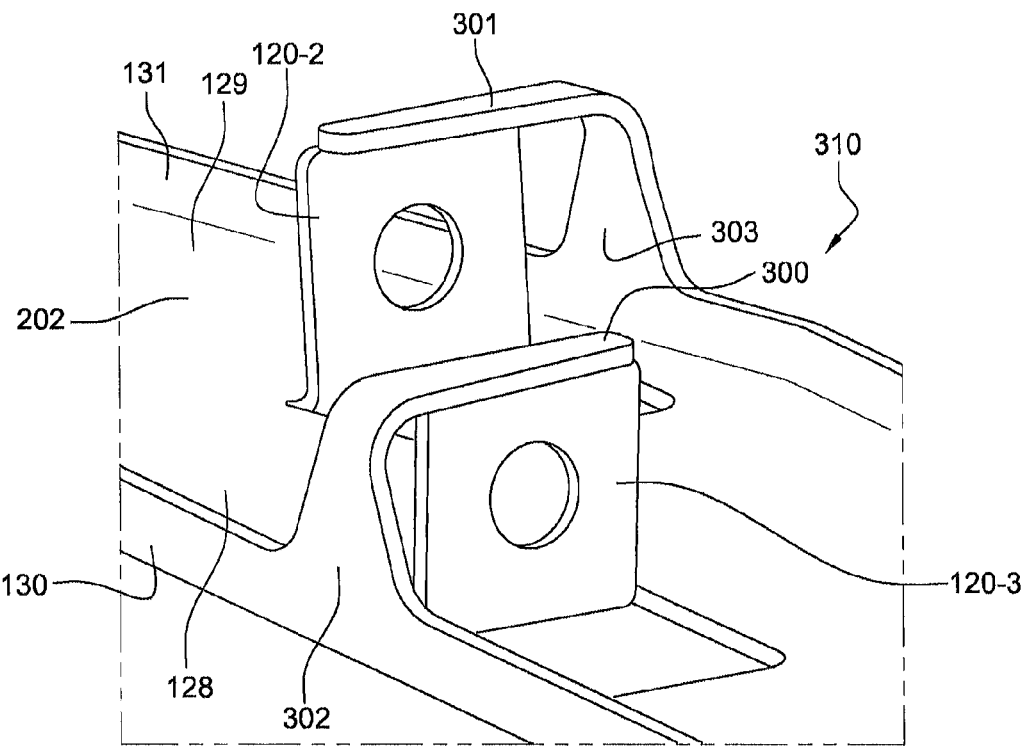
In FIG. 6, a partial view of an attachment plate comprising a first means of rigidifying and a second means of rigidifying.

FIG. 6 diagrammatically shows a first partial view of an attachment plate 310 comprising the third attachment tab 120-3 arranged on the right portion 128 of the main wall 202 and the second attachment tab 120-2 arranged on the left portion 129 of the main wall 202. The attachment plate 310 is differentiated from the attachment plate 201 in that it further comprises a first means of rigidifying 300 for the third attachment tab 120-3 and a second means of rigidifying 301 for the second attachment tab 120-2.

Advantageously, the first means of attaching 300 and the attachment plate 310 form a single piece. Alternatively, the first means of attaching 300 and the attachment plate 310 can be two parts made secure by welding or brazing. Likewise, the second means of attaching 301 and the attachment plate 310 advantageously form a single piece. Alternatively, the second means of attaching 301 and the attachment plate 310 can be two parts made secure by welding or brazing.

The attachment plate 310 has a right edge 130 and a left edge 131.

In the case where the first means of rigidifying 300 and the attachment plate 310 form a single piece, the first means of rigidifying 300 is advantageously a cut-out of an extension of the right edge 130 of the attachment plate 310 according to the shape of said first means of rigidifying 300 of which one side 302 is not cut out, with this side 302 belonging to the right edge 130 of the attachment plate 310. The first means of rigidifying 300 is then folded back over the third attachment tab 120-3. Then the first means of rigidifying 300 is made secure to said third attachment tab 120-3 by brazing or welding.

Likewise, in the case where the second means of rigidifying 301 and the attachment plate 310 form a single part the second means of rigidifying 301 is advantageously a cut-out from an extension of the left edge 131 of the attachment plate 310 according to the shape of said second means of rigidifying 301 of which one side 303 is not cut out, with this side 303 belonging to the left edge 131 of the attachment plate 310. The second means of rigidifying 301 is then folded back over the second attachment tab 120-2. Then the second means of rigidifying 301 is made secure to said second attachment tab 120-2 by brazing or welding.

Figure 7:
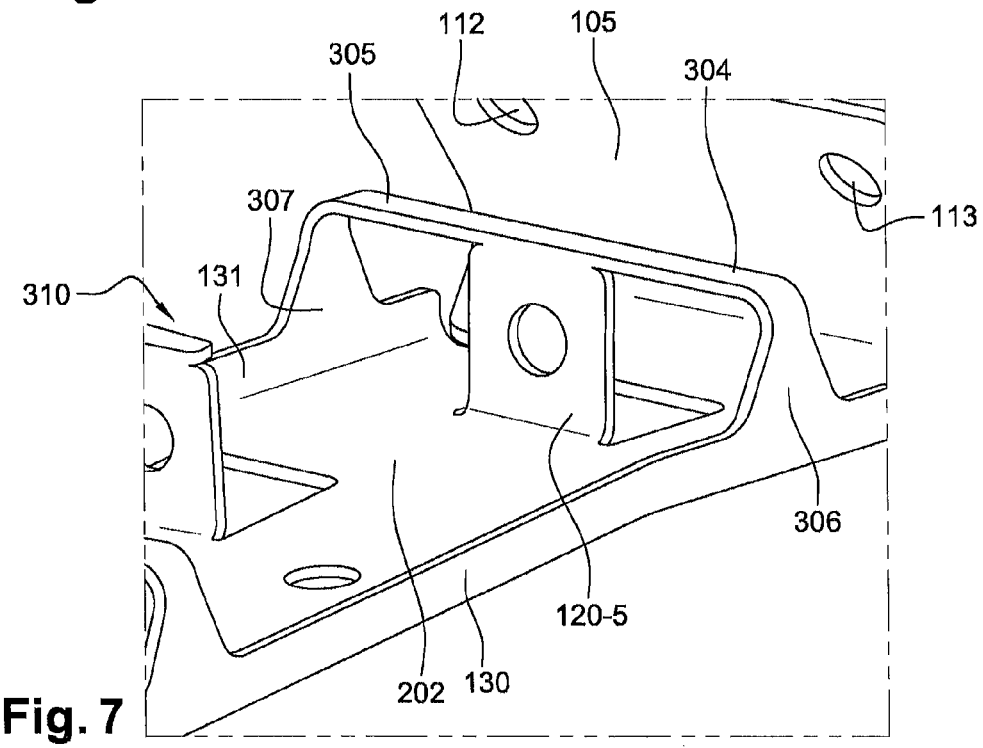
In FIG. 7, a partial view of an attachment plate comprising a third means of rigidifying.

FIG. 7 diagrammatically shows a second partial view of the attachment plate 310 comprising the fifth attachment tab 120-5 arranged substantially in the middle of the width of the main wall 202 of said attachment plate 310. The attachment plate 310 further comprises a third means of rigidifying 304 and a fourth means of rigidifying 305 for said fifth attachment tab 120-5.

The third means of rigidifying 304 is advantageously a cut-out of an extension of the right edge 130 of the attachment plate 310 according to the shape of said third means of rigidifying 304 of which one side 306 is not cut out, with this side 306 belonging to the right edge 130 of the attachment plate 310. The third means of rigidifying 304 is folded back over the fifth attachment tab 120-5. Then the third means of rigidifying 304 is made secure to said fifth attachment tab 120-5 by brazing or welding.

The fourth means of rigidifying 305 is advantageously a cut-out from an extension of the left edge 131 of the attachment plate 310 according to the shape of said fourth means of rigidifying 305 of which one side 307 is not cut out, with this side 307 belonging to the left edge 131 of the attachment plate 310. The fourth means of rigidifying 305 is folded back over the fifth attachment tab 120-5. Then the fourth means of rigidifying 305 is made secure to said fifth attachment tab 120-5 by brazing or welding.

The invention claimed is:

1. A cooling device for a casing of a jet engine, said cooling device comprising at least one first cooling tube and at least one supporting device, the supporting device comprising an attachment plate and at least one first attachment clamp, the attachment plate being adapted to be rendered secure to the casing of the jet engine, the attachment plate comprising a main wall which has an external face and an internal face that are provided on two opposite sides of the main wall such that the external and internal faces are oriented to face in opposite directions, the first attachment clamp comprising a clamp body surrounding the first cooling tube and an attachment element attached to the attachment plate, the clamp body of the first attachment clamp being positioned on a side of the internal face of the main wall of the attachment plate, wherein the attachment plate comprises:
at least one first opening;
at least one first attachment tab secured to said main wall of the attachment plate and arranged on at least one portion of a periphery of the first opening, the first attachment tab projecting from the external face of the main wall, the first attachment clamp passing through the first opening, the attachment element of said first attachment clamp being attached to the first attachment tab, and wherein the cooling device further comprises a means of rigidifying the first attachment tab.

2. The cooling device as claimed in claim 1, wherein the first attachment tab is substantially perpendicular to said main wall of the attachment plate.

3. The cooling device according to claim 1, wherein the first attachment tab and the attachment plate form a single piece.

4. The cooling device according to claim 1, wherein the main wall of the attachment plate has a first lateral edge and a second lateral edge, at least one of said first lateral edge and said second lateral edge being curved.

5. The cooling device as claimed in claim 1, wherein the main wall of the attachment plate has a first lateral edge and a second lateral edge, wherein the means of rigidifying is formed by an extension, rendered secure to the first attachment tab, by at least one of said first lateral edge and second lateral edge.

6. The cooling device according to claim 1, wherein the main wall of the attachment plate comprises several portions, two consecutive portions forming an angle between them.

7. The cooling device according to claim 1, further comprising at least one second cooling tube consecutive to the first cooling tube, the supporting device further comprising at least one second attachment clamp, the second attachment clamp comprising a clamp body surrounding the second cooling tube and an attachment element attached to the attachment plate;
wherein the main wall of the attachment plate comprises at least one second opening and at least one second attachment tab secured to said main wall of the attachment plate and arranged on at least one portion of a periphery of the second opening, the second attachment tab projecting from the external face of the main wall, the second attachment clamp passing through the second opening, the attachment element of said second attachment clamp being attached to the second attachment tab.

8. The cooling device as claimed in claim 7, wherein the main wall of the attachment plate comprises a right portion and a left portion extending according to a length of the main wall, wherein the first attachment tab and the second attachment tab are consecutive and are respectively present on said right portion and on said left portion of the main wall of the attachment plate.

9. An aircraft comprising a jet engine with at least one casing, wherein said casing comprises a cooling device, said cooling device comprising at least one first cooling tube and at least one supporting device, the supporting device comprising an attachment plate and at least one first attachment clamp, the attachment plate comprising a main wall which has an external face and an internal face, the first attachment clamp comprising a clamp body surrounding the first cooling tube and an attachment element attached to the attachment plate, the clamp body of the first attachment clamp being positioned on a side of the internal face of the main wall of the attachment plate, wherein the attachment plate comprises:
at least one first opening;
at least one first attachment tab secured to said main wall of the attachment plate and arranged on at least one portion of a periphery of the first opening, the first attachment tab projecting from the external face of the main wall, the first attachment clamp passing through the first opening, the attachment element of said first attachment clamp being attached to the first attachment tab, and wherein the cooling device further comprises a means of rigidifying the first attachment tab.

10. The aircraft according to claim 9, wherein the first attachment tab is substantially perpendicular to said main wall of the attachment plate.

11. The aircraft according to claim 9, wherein the first attachment tab and the attachment plate form a single piece.

12. The aircraft according to claim 9, wherein the main wall of the attachment plate has a first lateral edge and a second lateral edge, at least one of said first lateral edge and said second lateral edge being curved.

13. The aircraft according to claim 9, wherein the main wall of the attachment plate has a first lateral edge and a second lateral edge, wherein the means of rigidifying is formed by an extension, rendered secure to the first attachment tab, by at least one of said first lateral edge and second lateral edge.

14. The aircraft according to claim 9, wherein the main wall of the attachment plate comprises several portions, two consecutive portions forming an angle between them.

15. The aircraft according to claim 9, wherein the cooling device further comprises at least one second cooling tube consecutive to the first cooling tube, the supporting device further comprising at least one second attachment clamp, the second attachment clamp comprising a clamp body surrounding the second cooling tube and an attachment element attached to the attachment plate;
wherein the main wall of the attachment plate comprises at least one second opening and at least one second attachment tab secured to said main wall of the attachment plate and arranged on at least one portion of a periphery of the second opening, the second attachment tab projecting from the external face of the main wall, the second attachment clamp passing through the second opening, the attachment element of said second attachment clamp being attached to the second attachment tab.

16. The aircraft according to claim 15, wherein the main wall of the attachment plate comprises a right portion and a left portion extending according to a length of the main wall, wherein the first attachment tab and the second attachment tab are consecutive and are respectively present on said right portion and on said left portion of the main wall of the attachment plate.

* * * * *